United States Patent
Davie et al.

(10) Patent No.: US 7,009,409 B2
(45) Date of Patent: Mar. 7, 2006

(54) DETERMINATION OF GASKET INTEGRITY BY CAPACITANCE MEASUREMENT

(76) Inventors: Neil R. Davie, 146 Amelia La., Livingston, TX (US) 77351; E. Michael Coffey, 527 Bel St., Kemah, TX (US) 77565

(\*) Notice: Subject to any disclaimer, the term of this patent is extended or adjusted under 35 U.S.C. 154(b) by 269 days.

(21) Appl. No.: 10/191,155

(22) Filed: Jul. 9, 2002

(65) Prior Publication Data

US 2003/0042688 A1    Mar. 6, 2003

Related U.S. Application Data

(60) Provisional application No. 60/311,156, filed on Aug. 10, 2001.

(51) Int. Cl.
*G01R 27/26*    (2006.01)

(52) U.S. Cl. ........................... 324/658; 324/663
(58) Field of Classification Search ............ 324/658, 324/660–663; 73/763, 767, 774, 775, 750, 73/718, 724

See application file for complete search history.

(56) References Cited

U.S. PATENT DOCUMENTS

| | | | | |
|---|---|---|---|---|
| 4,388,668 A | * | 6/1983 | Bell et al. | 361/283.4 |
| 4,969,105 A | * | 11/1990 | Gaenssle | 700/275 |
| 5,121,929 A | * | 6/1992 | Cobb | 277/317 |
| 5,581,019 A | * | 12/1996 | Minor et al. | 73/115 |

\* cited by examiner

*Primary Examiner*—John Teresinski

(57) ABSTRACT

A determination is made of the integrity of a gasket seal between two mating flange faces using capacitance measurement as an indication of the spacing between the flanges and thus the amount of gasket compression. The capacitance measurement can be made between a capacitor plate carried by the gasket and at least one of the flanges which serves as another capacitor plate. A capacitance-measuring instrument connected to the plates provides a measured capacitance signal that can be provided to a signal-processing instrument such as a personal computer. Further, the personal computer can be linked to a remote data center over a communications link for the transfer of gasket compression data.

41 Claims, 15 Drawing Sheets

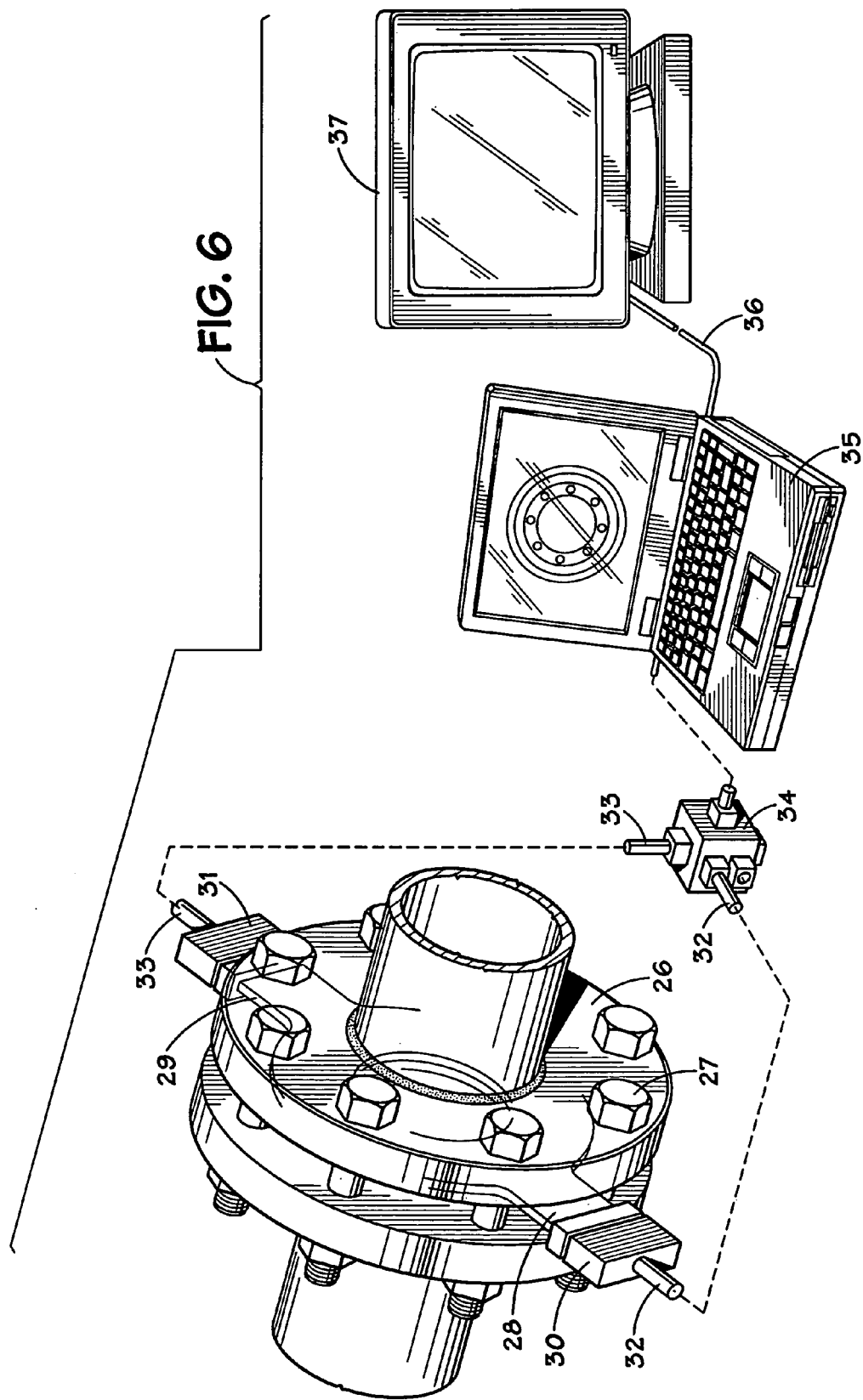

DETERMINATION OF GASKET INTEGRITY BY CAPACITANCE MEASUREMENT

CROSS-REFERENCE TO RELATED APPLICATION

This application claims priority of U.S. Provisional Application Ser. No. 60/311,156 filed Aug. 10, 2001.

FIELD OF THE INVENTION

This invention relates generally to gasket integrity monitoring devices, and more particularly, it relates to a device for ascertaining proper gasket compression and sealing between mating flange faces.

BACKGROUND OF THE INVENTION

Heretofore, approaches to achieving proper compression and sealing of a gasket positioned between mating flanges have included the use of a torque wrench and the use of applied force measuring devices that are responsive to stress and strain such as piezoelectric elements. Each of these techniques is, however, subject to measurement inaccuracies because of various factors such as bolt friction, lack of flange parallelism, sensing element non-linearity, and sensing element temperature sensitivity. There exists a need for an apparatus and a method that provide an improved measurement of gasket integrity regardless of existing environmental conditions and other factors that affect gasket performance.

SUMMARY OF THE INVENTION

The present invention provides for a determination of gasket sealing integrity using capacitance measurement as an indication of gasket spacing and gasket compression. A gasket configured to provide a seal between two flanges carries a capacitor plate. Another capacitor plate is formed by a flange. Together, a gasket compression capacitance sensor is formed. The capacitor plates are connectable to a capacitance-measuring instrument. Measured capacitance is a function of the spacing between the plates which is in turn a function of gasket compression. The capacitance-measuring instrument provides a signal indicative of the measured capacitance for driving a display providing a readout of gasket compression or for further processing.

The gasket may carry an array of capacitor plates. In combination with a flange, which provides a second capacitor plate, a plurality of capacitors are formed at discrete locations on the gasket to provide a plurality of gasket compression capacitance sensors. Each capacitor plate in the array is connectable to the capacitance-measuring instrument. Each of two mating flanges may constitute a capacitor plate and provide for a determination of gasket spacing relative to each flange and gasket compression.

Through calibration of the capacitance-measuring instrument, a display of the measured capacitance signal can be provided of gasket compression forces in predetermined units of measurement. The display can be used by a gasket installer for guidance in properly installing the gasket.

The measured capacitance signal can be provided to a signal-processing instrument. The signal-processing instrument can be implemented using a personal computer. The measured capacitance signal can be routed to the personal computer over an interface such as a Universal Serial Bus (USB). Processing of the measured capacitance signal can be used to provide a graphical user interface (GUI) to the gasket installer for guidance in properly installing the gasket. Further, a data file record can be made of the gasket installation parameters for archival purposes. Such a data file record can be transmitted over a communication link to a central data center.

The signal-processing instrument can be provided as a dedicated microprocessor-based unit without all the capabilities normally provided by a personal computer. Such a signal-processing instrument can provide for gasket integrity data collection, data storage, data display, and data transmission over a communication link.

In addition, field maintenance personnel can monitor gasket integrity and performance by periodically connecting the capacitance-measuring instrument to the capacitor plates of a gasket and making a determination as to whether the gasket is under appropriate compression. Such determination may be made in the field or transmitted to a central monitoring station. In a bi-directional communications link between the capacitance measuring instrument and a central monitoring station, gasket performance data can be up-linked to the central monitoring station and instructions for adjustments to the gasket installation can be returned to field maintenance personnel. Communications links such as a telephone line connection and a wireless telephone connection can be utilized. Further, a communication link over an Internet connection may be utilized.

DESCRIPTION OF THE PREFERRED EMBODIMENTS

Figure 1:
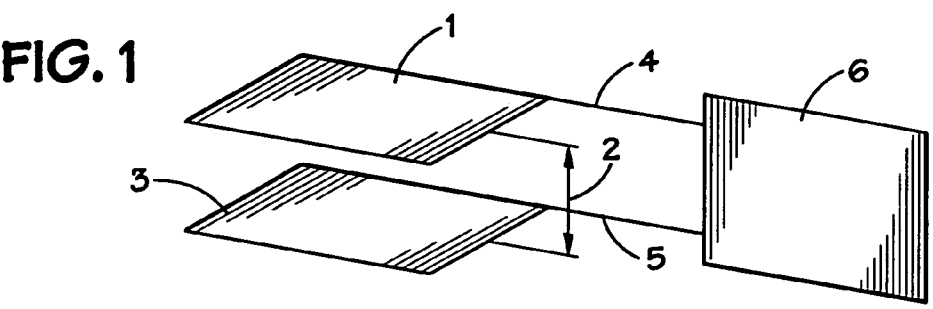
FIG. 1 is a schematic illustration of a parallel plate capacitor and capacitance measuring instrument arrangement that is fundamental to the present invention.

As represented schematically in FIG. 1, a capacitor 10 is formed by two parallel plates 12 and 14 of equal area "A" and an insulating dielectric material (not shown) between the plates, which has a dielectric constant "K". The dielectric constant for air is unity, or 1.0. Thus, the ratio of the capacitance "C" achieved with like spacing and area utilizing an insulator other than air has a dielectric constant "K" that is greater than air (1.0). The parallel plates 12 and 14 are connected by leads 18 and 20 to a capacitance-measuring instrument 22. The commonly known equation for capacitance is:

$$C = \frac{.224KA(n-1)}{d}$$

where:
A=the area of the smallest parallel plate in square inches
K=the dielectric constant of material between plates
d=spacing between plate surfaces in inches, and
n=number of plates.

From this relationship, it can be seen that the distance "d" can be readily determined by a measure of the capacitance if area "A" and dielectric constant "K" are known and fixed.

The dielectric constant for a material, while theoretically a "constant" does have slight variances for some conditions and requires selection of an appropriate material to be within acceptable bounds for a particular application. Most practical materials for gasket applications are suitable for capacitive sensing purposes because they do have low sensitivity to temperature, humidity, aging and other environmental factors. Gaskets made from a composite dielectric material, for example, a material containing compressible air space in conjunction with a dielectric material of higher value will change in a predictable way as it is compressed and will actually enhance the change of measurable capacitance read as compression progresses. One such material is a ceramic fiber material that has found use in gaskets for high temperature gasket applications.

Therefore, if a pair of capacitor plates is associated with a gasket such that compression of the gasket affects the spacing between the plates, the amount of gasket compression can be determined. In essence, therefore, a gasket compression sensor is provided by measuring capacitance. Control within acceptable tolerances of the area "A" and dielectric constant "K" is assumed. The area "A" can be effectively made and maintained at very close tolerances during manufacture of the gasket by conventional etching operations commonly used in flexible circuit construction. The electrical conductors for connecting the plate leads are also preferably narrow etched areas leading to the exterior of the gasket.

Figure 2:
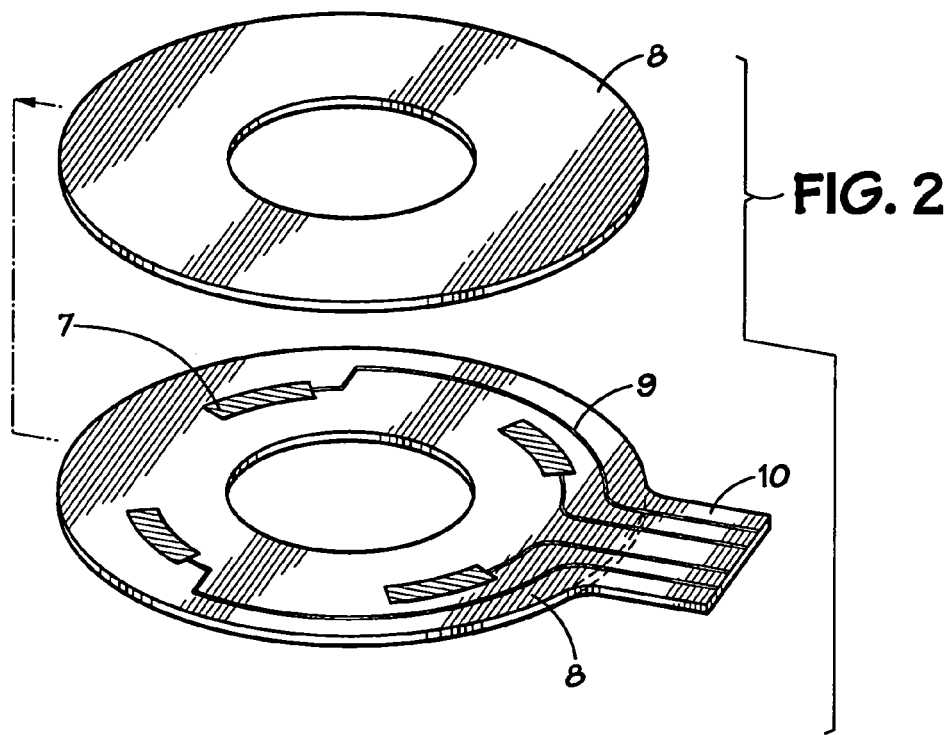
FIG. 2 illustrates a gasket carrying a capacitor plate.

The gasket shown in FIG. 2 carries an array of capacitor plates 24, 26, 28 and 30. The plates are shown to be sandwiched between two laminated gasket layers 32 and 34. Preferably, the gasket layers are of equal thickness so as to place the capacitor plate at a centralized location within the overall gasket. In certain applications such a construction may not be acceptable. For those applications, a gasket may be slit along the peripheral edge to form a pocket and the plates disposed inside the pocket. The gasket includes a connector tab 36 providing for coupling of plate conductors 38, 40, 42 and 44 to capacitance measuring instrument 22. Each capacitor plate in the array forms the basis for what is termed herein "a gasket compression capacitance sensor." That is, gasket compression can be locally determined within the region of the gasket where a given capacitor plate is positioned by measuring the capacitance at the location.

Figure 3:
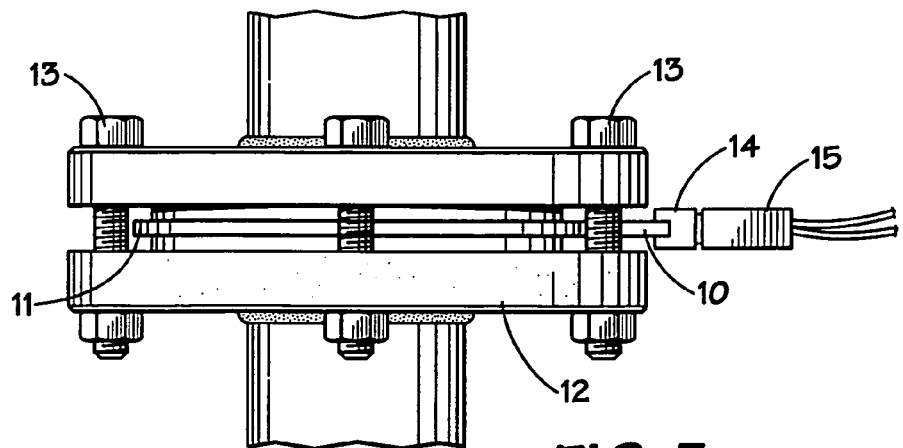
FIG. 3 illustrates the gasket of FIG. 2 installed between flanges that are bolted together and compress the gasket to effect a seal.

FIG. 3 shows the gasket of FIG. 2 installed between metal flanges 46 and 48 held together by four bolts of which bolts 50, 52 and 54 are in view. When bolted together, flanges 46 and 48 compress the gasket. The gasket of FIG. 2 provides one capacitor plate and each of the flanges can provide a second capacitor plate. Accordingly, an electrical connection for capacitance measurement is also made to the flanges. One capacitor plate of the array carried by the gasket is preferably disposed proximate each of the bolts that hold the mating flanges together. The capacitance measuring instrument 22 is connected to both the flanges 46 and 48 and the plate conductors 38, 40, 42 and 44. Instrumentation capable of measuring capacitance between parallel plates is well know to those of ordinary skill in the art. For example, a resonant circuit having the capacitive gasket compression sensor connected therein as a component can be used. A driving signal such as an impulse signal can be applied to the resonant circuit and a measurement made of the circuit's resonant frequency. As the spacing between the capacitor plates and the flanges changes, such that the capacitance changes, the resonant frequency of the circuit also changes. The measured frequency is therefore indicative of the spacing between the capacitor plates and the flanges and correspondingly a measurement of the gasket compression. A calibration of frequency response as a function of gasket compression provides for a display of gasket compression in meaningful units such as a torque measure in foot-pounds or a pressure measurement in pounds per square inch. Also, the circuit shown in FIG. 22 provides another form of a capacitive measuring instrument.

When the gasket is installed, an installer such as field service personnel successively tightens the bolts. Tightening of the bolts acts to compress the gasket. As the gasket is compressed, the distance between the capacitor plates of the array carried by the gasket and the plate formed by each of the flanges decreases. As the distance decreases, the measured capacitance of the capacitors formed by the plates changes. The change in capacitance provides an indication of the extent of compression of the gasket and guides the installer in tightening the bolts. Bolt tightening sequences are commonly observed. The indication of gasket compression provided by the capacitance measurement allows more precise tightening of the bolts. Further, with the, array of capacitors at distributed locations proximate the bolts, the pattern of bolt tightening may be optimized beyond the normal practice of tightening in a cross pattern sequence. The objective, of course, is to achieve appropriate compression of the gasket without tilting of the flange faces.

Figure 4:
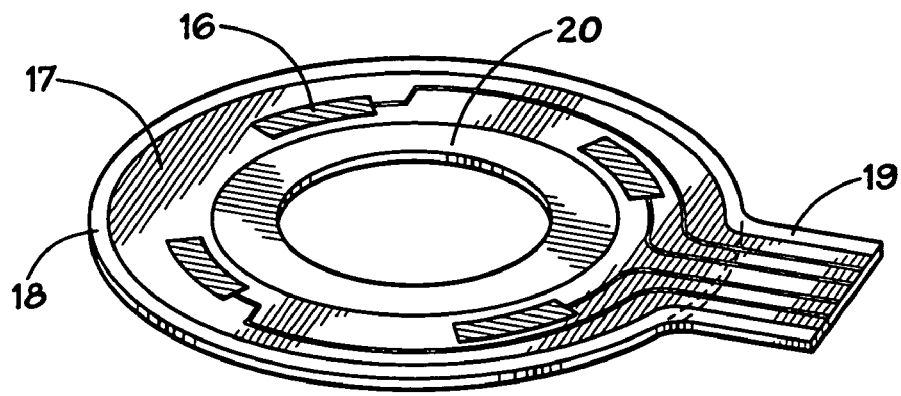
FIG. 4 illustrates a gasket having a sealing area surrounded by an insulating ring and carrying a capacitor plate.

FIG. 4 shows a gasket similar to the gasket of FIG. 2. The gasket of FIG. 4 further includes a sealing ring 56 surrounding the gasket sealing area 58. The sealing ring may be either metal or an insulating material. The sealing ring prevents spreading of the gasket sealing material under compression and a positive stop to prevent over-tightening. Such construction is similar to gaskets referred to as spiral wound gaskets commonly used on flat face flanges and on raised face flanges. The capacitor plate array is placed outside the sealing area 58 and within area 59, but the array remains between the flange faces. For example, with a raised face flange, the raised face will extend radially beyond the sealing area so as to overlap the area 59.

Figure 5:
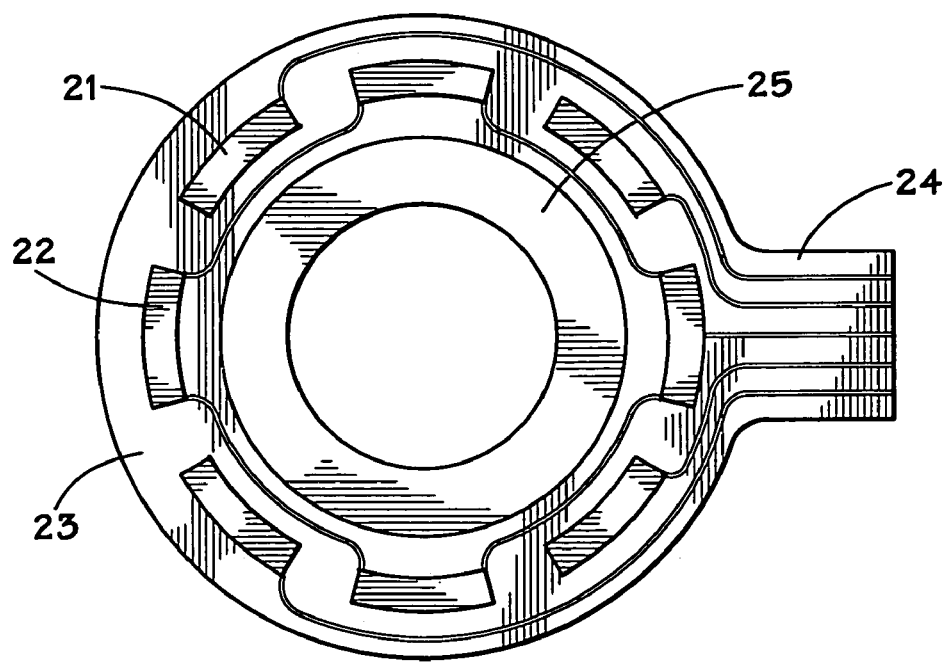
FIG. 5 illustrates a gasket having a pair of capacitor plates

The gaskets of FIGS. 2 and 4 require a direct electrical connection to the flanges 46 and 48. FIG. 5 shows an alternate arrangement to make electrical connection to the flanges. The gasket carries an array 60 of interconnected elements that form a common electrode. The common electrode is capacitively coupled to the flange and a single conductor extends to the connector tab.

Figure 6A:
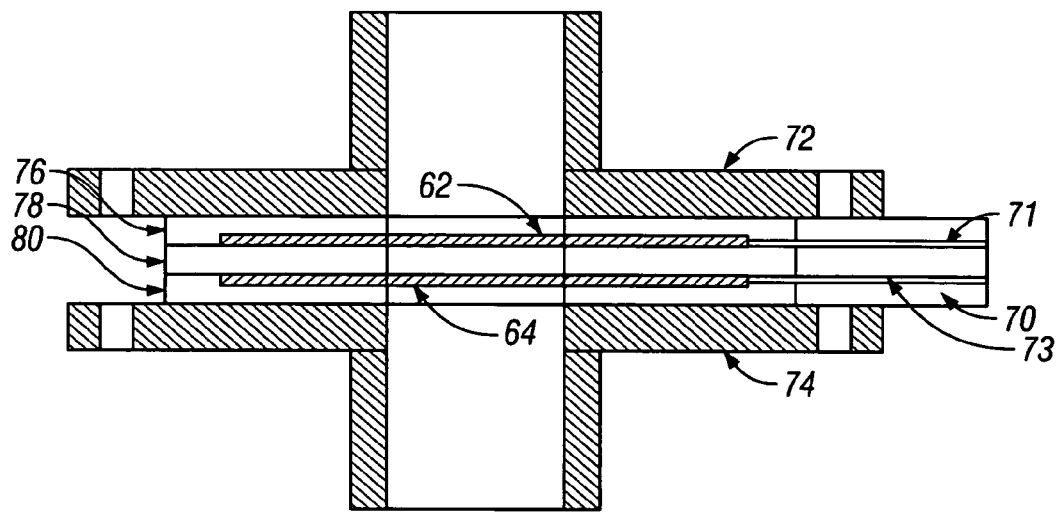
FIG. 6A illustrates a gasket having two capacitor plates sandwiched between gasket layers.
Figure 6B:
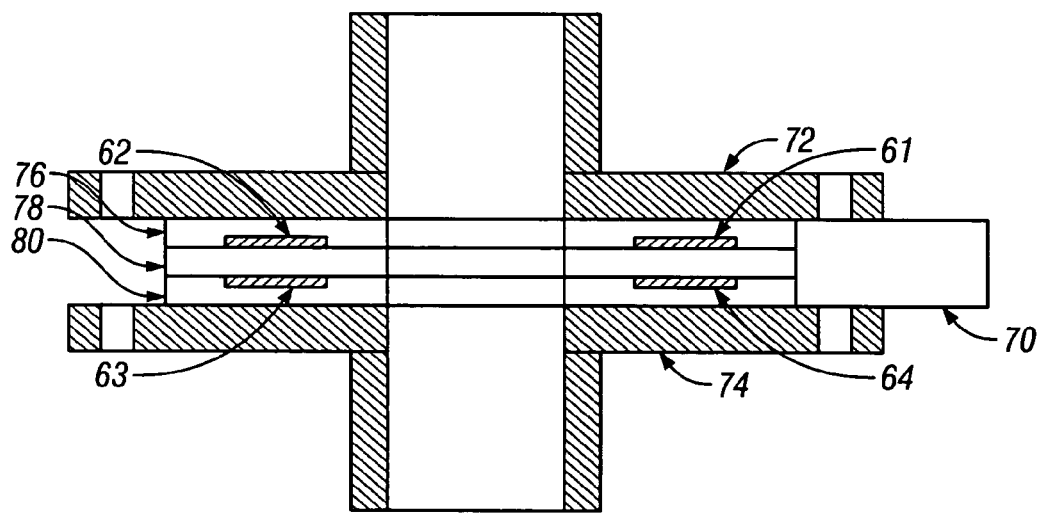
FIG. 6B illustrates a gasket having two capacitor plate arrays sandwiched between gasket layers.

FIG. 6A shows a gasket carrying two capacitor plates 62 and 64. Conductors 71 and 73 extend to tab 70 at the peripheral edge of the gasket. The gasket is shown providing a seal between two flanges 72 and 74. In FIG. 6B, the upper and lower capacitor plates are provided as an upper array including plates 61, 62 and a lower array including plates 63, 64. In the arrangements of FIGS. 6A and 6B, there are three gasket layers. In the arrangements of FIGS. 6A and 6B, the gasket includes first, second and third gasket layers 76, 78 and 80. The plate 62 is embedded or recessed into layer 76 and plate 64 is embedded or recessed into layer 80. The middle layer 78 may comprise a dielectric material.

Unlike the gasket configuration of FIG. 3, in the arrangement of FIGS. 6A and 6B, the flanges are not used as a capacitor plate. The capacitance-measuring instrument is connected to the upper and lower capacitor plates in the manner previously discussed relative to FIGS. 2 and 3.

Figure 7:
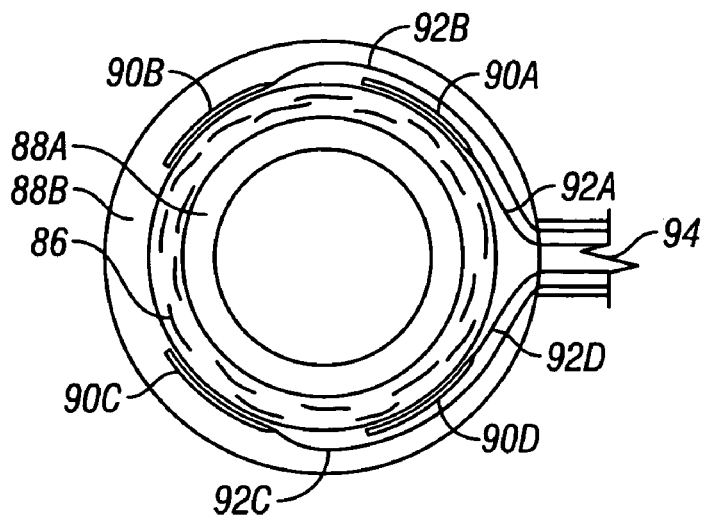
FIG. 7 illustrates a spiral wound gasket having an array of capacitor plates.
Figure 7B:
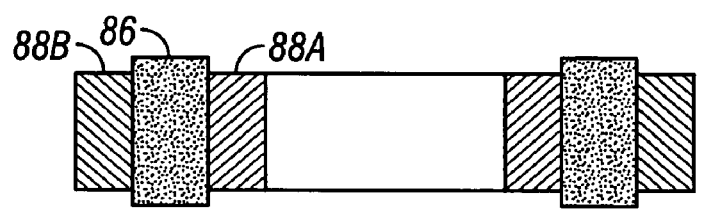
FIG. 7B shows a cross-section of the spiral wound gasket of FIG. 7.

FIG. 7 shows a plan view of a gasket having a spiral wound gasket component 86 carried on an insulated ring. The gasket has a solid metal inner guide ring portion 88A and a solid metal outer guide ring portion 88B. The outer guide ring provides radial support for the spiral wound component, and the inner guide ring provides radial support for the spiral wound component on the inside diameter. The gasket of FIG. 7 is similar to the gasket of FIG. 4 in that both have an outer guide ring. The gasket of FIG. 7 can be used on plain face flanges and on raised face flanges. A cross section view of the gasket is diagrammed in FIG. 7B.

Figure 7C:
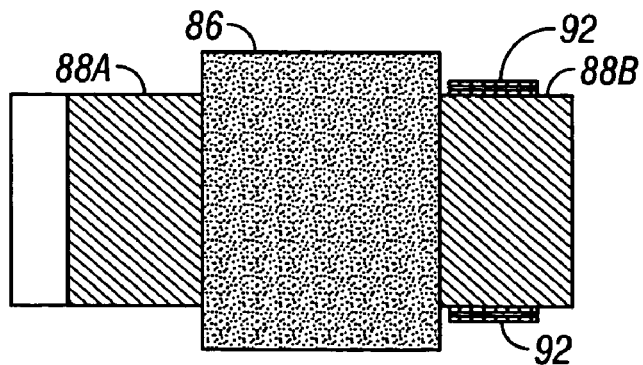
FIG. 7C shows a detailed sectioned portion of the spiral wound gasket of FIGS. 7 and 7B.

As seen in FIG. 7, the outer guide ring portion 88B carries an array of capacitor plates 90A, 90B, 90C and 90D. Each plate is coupled to a conductor 92A, 92B, 92C and 92D. The conductors lead to a peripheral tab 94, which provides a connector. FIG. 7C diagrams a plate structure in place on a face of the outer guide ring and positioned close to the spiral wound component. Typically, another array of capacitor plates (not shown in FIG. 7) is placed on the opposite side face of the outer guide ring (see FIG. 7C) with each plate in the array being positioned to be opposite a corresponding plate of plates 90A, 90B, 90C and 90D. In the situation of a plate array on both sides of the outer guide ring, the connector tab portion would have conductor terminations on both sides.

The capacitor plate structure is diagrammed in FIG. 7C to show a dielectric layer over a metallization layer. The capacitor plate structure is configured such that a dielectric layer is on each side of the metallization layer. If the guide ring is made of an insulating material rather than metal, the lower dielectric layer is unnecessary. With either a metal guide ring or an insulating guide ring, the extent of compression of the dielectric nevertheless takes place within its linear range of compressibility.

Figure 8:
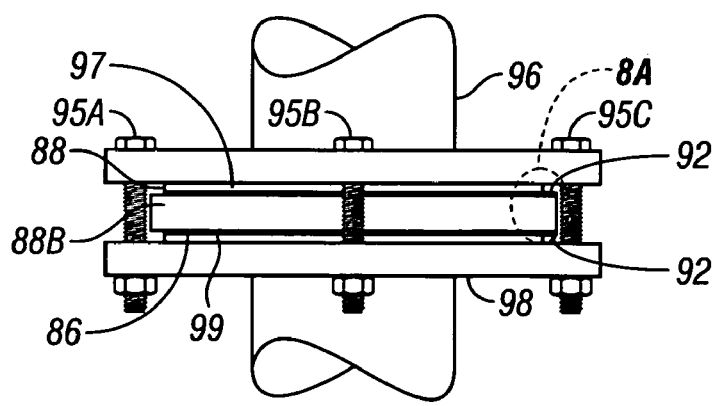
FIG. 8 illustrates the spiral wound gasket of FIG. 7 installed between flanges that have a raised center portion.
Figure 8A:
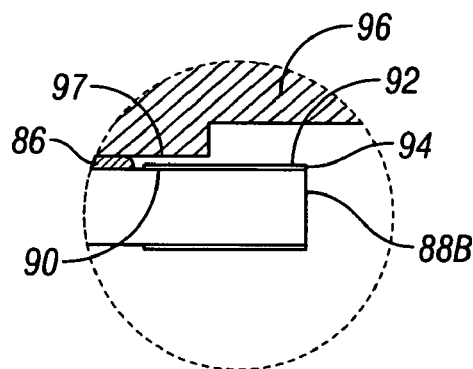

In FIG. 8, the gasket of FIG. 7 is shown installed between raised face flanges 96 and 98. Flange 96 has a raised face area 97 and flange 98 has a raised face area 99. Bolts 95A, 95B, 95C and 95D (not in view) pull the flanges together to compress the spiral wound gasket portion 86. FIG. 8A shows a close-up and detailed view of a segment of the installation shown in FIG. 8. The close-up view shows the capacitor plate 90 located close to the spiral wound component 86. The raised face portion 97 of flange 96 is shown to extend radially beyond the peripheral edge of spiral wound component 86 and overlaps capacitor plate 90. The overlapping raised face portion is in close proximity to the capacitor plate and forms a second capacitor plate. When the flanges are pulled together, the overlapping raised face portion bears against the dielectric layer and compresses it. The compression of the dielectric layer is, of course, indicative of the extent of compression of the spiral wound component. Therefore, the variation in measured capacitance between the overlapping raised face portion 97 and the capacitor plate 90 provides for a determination of the compression of the spiral wound component.

Figure 9:
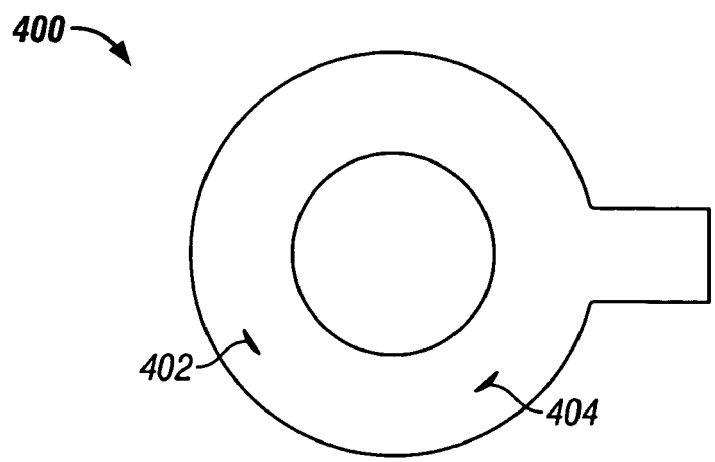
FIG. 9 illustrates a gasket having two raised alignment protuberances.
Figure 10:
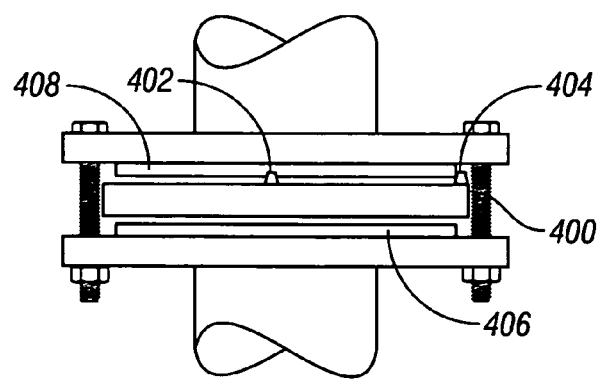
FIG. 10 illustrates the gasket of FIG. 9 installed between mating raised face flanges.

FIG. 9 shows a gasket 400 with raised alignment areas in the form of protuberances 402 and 404 on the face thereof. Tolerances exist in industry standards as to the size of a raised flange area and as to the size of a spiral wound gasket area. Also, the bolt holes in the flanges are larger than the bolts. Thus, in normal installations, there is an area of misalignment that inherently exists. The raised areas 402 and 404 provide for more accurate centering of the gasket. During installation, the gasket is pushed or dropped between the flanges. The raised areas, as shown in FIG. 10, direct the gasket into position between the flanges. The protuberances shown in FIG. 10 are somewhat exaggerated in size for illustrative purposes. The raised areas, as shown in FIG. 9, are positioned apart less than 180° around the gasket. As further shown, the raised areas or protuberances 402 and 404 are somewhat elongated. That is, the length is slightly greater than the width. Also, the protuberances can be either straight or have a slight arcuate shape.

Figure 11:
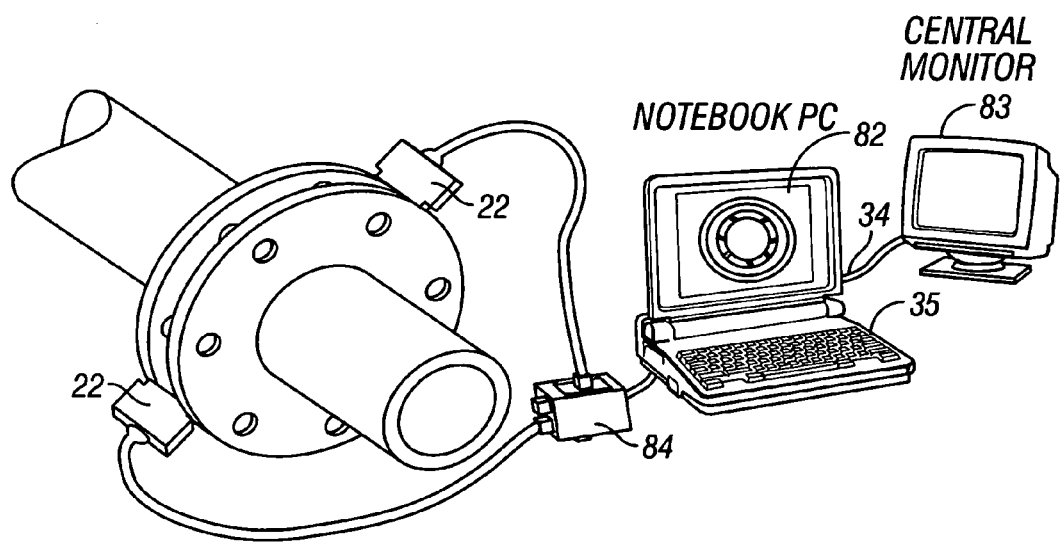
FIG. 11 illustrates capacitance measuring instruments coupled to the gasket and flange arrangement of FIG. 3, and wherein the capacitance measuring instruments are interfaced to a personal computer that has a wireless communication link to a central monitoring center.

FIG. 11 shows the gasket and flange arrangement of FIG. 3 wherein the capacitance-measuring instrument is connected to a processing and display in the form of personal computer 82. The connection to computer 82 is made via a USB interface 84. The arrangement of FIG. 3 is used for illustrative purposes. Any of the gasket and flange arrangements described herein will be similarly connectable to the capacitance-measuring instrument. The personal computer provides a display of information concerning the measure of the spacing between the flanges and the capacitor plates carried in the gasket. Thus, the gasket compression is also determined. The information can be presented by a graphical user interface or other display in a manner most advantageous to an installer or maintenance personnel. Use of the USB interface allows power to the capacitance measuring instrument circuitry to be provided over the USB connecting cables from the computer or connection hubs commonly employed with the USB. Further remote transfer of information for monitoring can be easily implemented using a modem or local area network connection from the computer to a remotely located central monitoring station or data center 83. Use of an IEEE 802.11b standard wireless local area network commonly found on laptop computers is an example of a facility for central monitoring without a necessity for running interconnecting lines.

Figure 12:
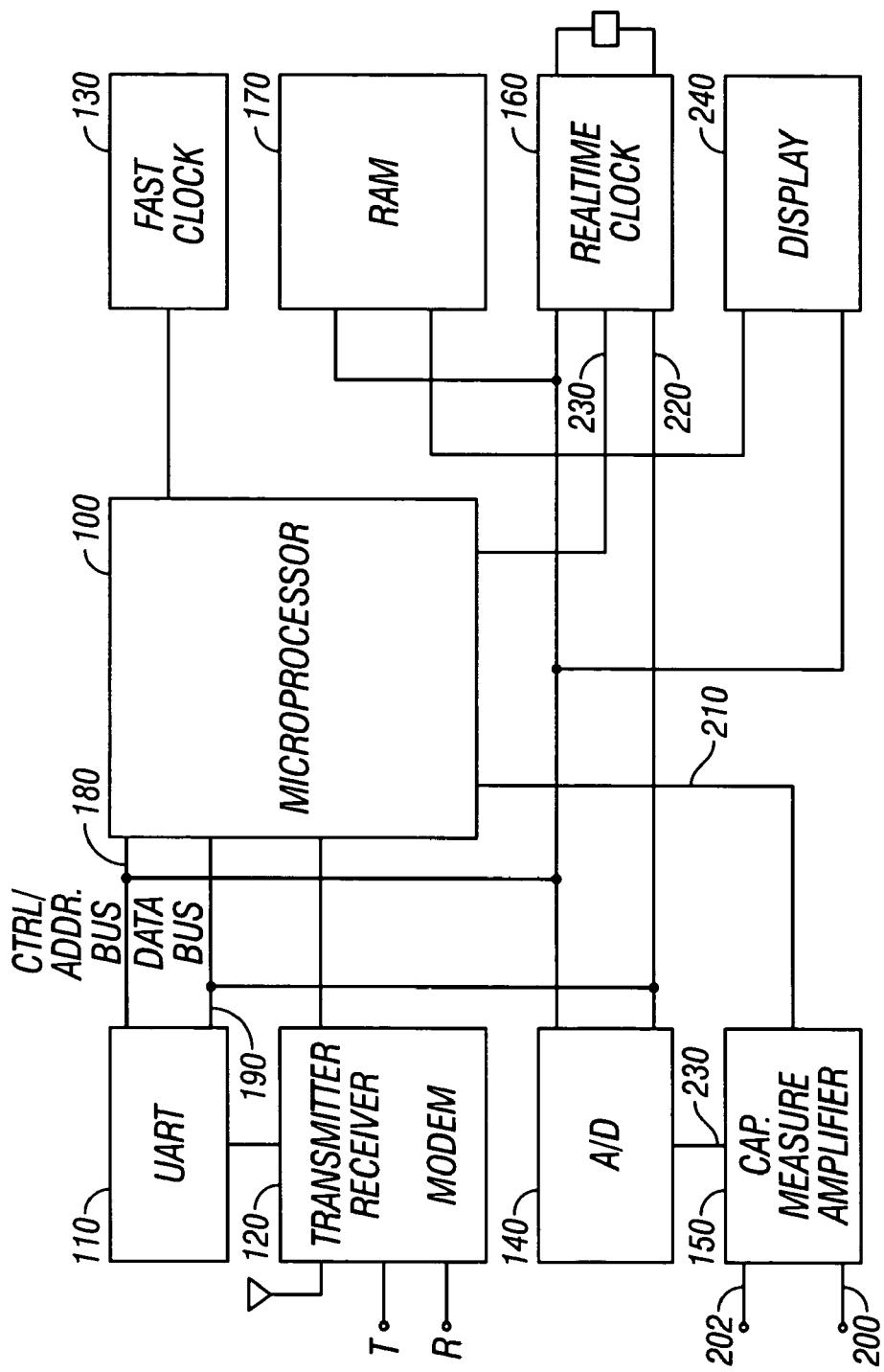
FIG. 12 illustrates a signal-processing instrument provided as a dedicated microprocessor-based unit with communications capability.

FIG. 12 shows a signal-processing instrument implemented as a dedicated microprocessor-based unit without all the capabilities normally provided by a personal computer. Such a signal-processing instrument can provide for gasket integrity data collection, data storage, data display, and data transmission over a communication link. Instrument 90 includes conductors 200 and 202 for connecting to the capacitor plates of a gasket arrangement shown in any of FIGS. 2, 4, 5 and 6. The conductors connect the capacitor plates to a capacitance measuring circuit and amplifier 150. Circuit 150 may also be provided as a separate unit as shown in FIG. 11. The capacitance measurement is applied to an analog-to-digital (A/D) converter 140 coupled to data bus 190. Also, coupled to the data bus is microprocessor 100, RAM 170, display 240, UART 110, and real time clock 160. A control/address bus 180 also interconnects those components as shown. The UART 110 provides formatted data to a transceiver unit 80. The unit 80 includes a modem for connection to the tip (T) and ring (R) lines of a telephone circuit. Also, unit 80 includes a wireless communications capability over an antenna. Instrument 90 can be packaged as a portable, battery-powered unit for handheld operation by field personnel.

Figure 13:
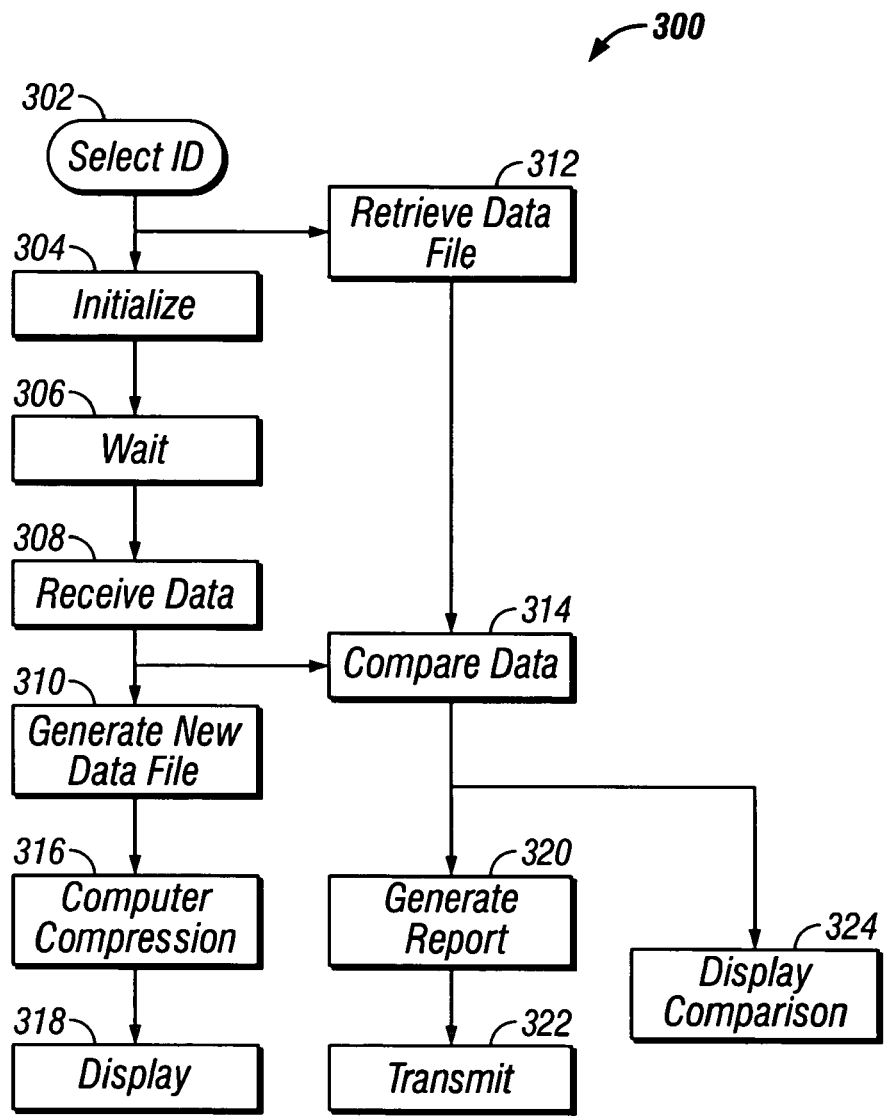
FIG. 13 illustrates a flowchart of the programmed functional operation of the personal computer of FIG. 11 and the signal-processing instrument of FIG. 12.

FIG. 13 shows a flowchart 300 for implementation as a software module. The flowchart illustrates the programmed operation of personal computer 82 and the signal-processing instrument. After an identification of the particular gasket is made by the Select ID block 302, the capacitance-measuring instrument is initialized at block 304. Then, a period of time is allowed at Wait block 306 during which time the capacitance measurement is made. The data is received at block 308. The received data is used to create a new data file at block 310. If the gasket has already been installed such that there is an existing data file, the file was retrieved at block 308 after the Select ID operation. The retrieved data is provided to a Compare Data block 314 which also is provided with the received data at block 308. After a new data file is generated, the gasket compression is computed at block 316. This computation is done on the basis of the equation for capacitance from which the distance "d" parameter is derived. The distance "d" parameter is then used in accordance with a stored look-up table to determine the gasket compression. The computed compression is displayed at block 318. The flowchart also shows that based upon the data comparison at block 314, a report is generated at block 320 and transmitted at block 322. Also, the data comparison is displayed at block 324. The circuitry of FIG. 12 may be conveniently packaged in a handheld device similar to a personal digital assistant (PDA) or a similar portable data entry instrument.

Figure 14:
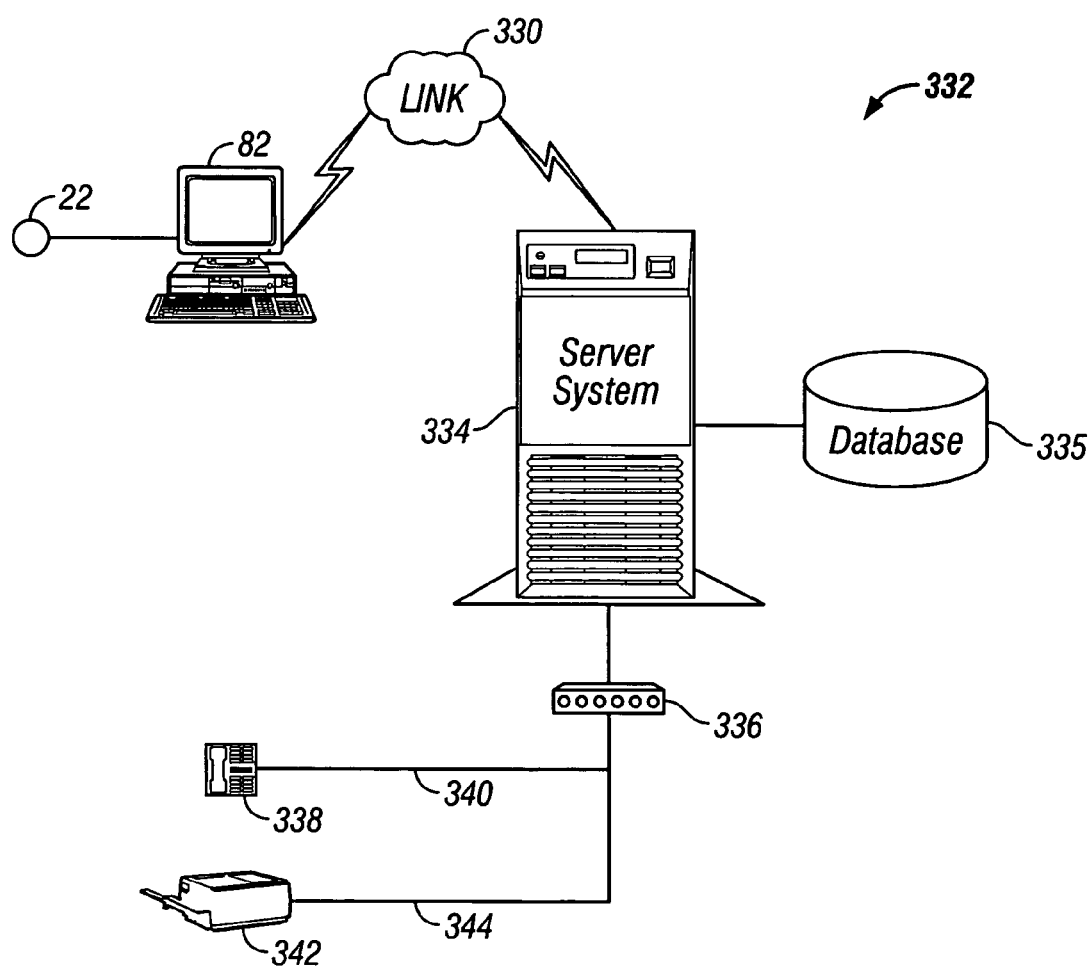
FIG. 14 illustrates a data communication link between the personal computer of FIG. 11 and a remote data center.

Through calibration of the capacitance-measuring instrument, a display of the measured capacitance signal can be provided on either personal computer 82 or instrument 90 of gasket compression forces in predetermined units of measurement. The display can be used by a gasket installer for guidance in properly installing the gasket. Further, a data file record can be made of the gasket installation parameters for archival purposes. Such a data file record can be transmitted over a communication link to a central data center. Such an arrangement is shown in FIG. 14. In addition, field maintenance personnel can use either personal computer 82 or instrument 90 to monitor gasket integrity and performance during periodic maintenance. Such determination may be made by personnel in the field using a locally stored database or by transmission to a central monitoring station where the data is analyzed. In a bi-directional communications link between the field unit (computer 82 or instrument 90) and a central monitoring station, gasket performance data can be up-linked to the central monitoring station and instructions for adjustments to the gasket installation can be returned to field maintenance personnel. Communications links such as a telephone line connection and a wireless telephone connection can be utilized. Further, a communication link over an Internet connection may be utilized.

FIG. 14 is a block diagram showing automated collection and analysis of gasket compression information retrieved from a particular gasket installation for remote monitoring. A gasket (not shown) is connected to capacitance measuring instrument 22 interfaced to personal computer 82. As indicated in the flowchart of FIG. 13, capacitance measurement data for the gasket is stored as a set of collected measures stored as data files for later retrieval. The data files are telemetered over a communication link 330 to the remote data center 332. The telemetered data files received at the data center are analyzed by server system 334, which includes a database 335. The feedback can then be provided back to the field personnel evaluating the gasket through a variety of media. By way of example, the feedback can be sent as an electronic mail message generated automatically by the server system 334 for transmission over the communication link 330. The electronic mail message is received by personal computer 82. Alternatively, the feedback can be sent through a telephone interface device 336 as an automated voice mail message to a telephone 338 over phone line 340 or as an automated facsimile message to a facsimile machine 342 over phone line 344, both also situated for local access by the field personnel. In addition to a personal computer 82, telephone 338, and facsimile machine 342, feedback could be sent to other related devices, including a network computer, personal data assistant, television, or digital data processor.

Figure 15:
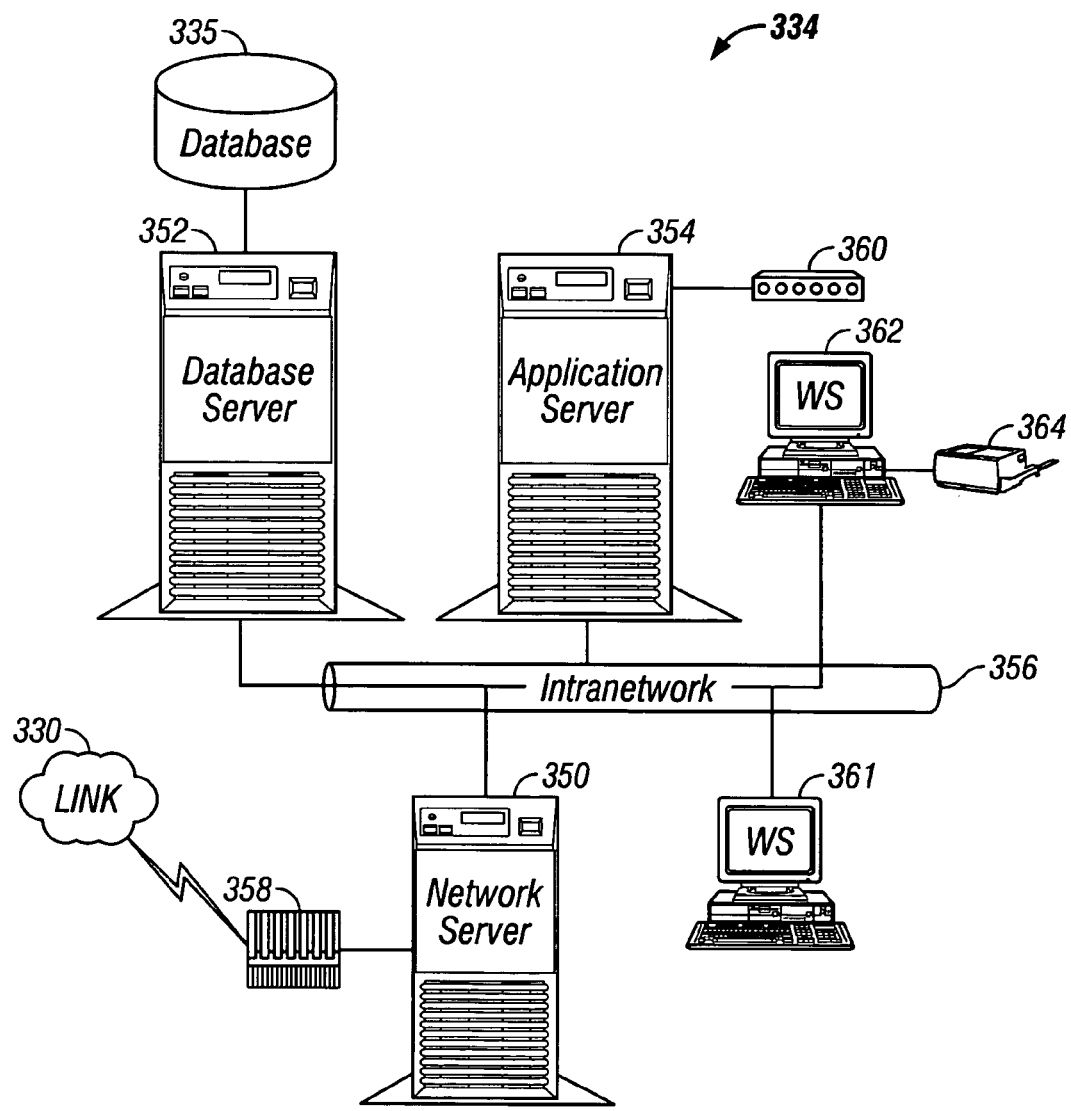
FIG. 15 illustrates the server system of the remote data center.

FIG. 15 is a block diagram showing the hardware components of the server system 334 of the system of FIG. 14. The server system 334 consists of three individual servers: network server 350, database server 352, and application server 354. These servers are interconnected via an intranetwork 356. In the described embodiment, the functionality of the server system 334 is distributed among these three servers for efficiency and processing speed, although the functionality could also be performed by a single server or cluster of servers. The network server 350 is the primary interface of the server system 334 to link 330. The network server 350 receives the collected data files that are telemetered from the field over link 330 as shown in FIG. 14. The network server 350 is interfaced to the link 330 through a router 358. To ensure reliable data exchange, the network server 350 preferably implements a TCP/IP protocol stack, although other forms of network protocol stacks are suitable.

The database server 352 organizes the data files in the database 335 and provides storage of and access to information held in those files. A high volume of data in the form of collected measures sets from individual gaskets is received. The database server 352 frees the network server 350 from having to categorize and store the individual collected measures sets in the data files. The application server 354 operates management applications and performs data analysis on the stored data files in developing gasket integrity records. The application server 354 communicates feedback to the field personnel either through electronic mail sent back over the link 330 via the network server 350 or as automated voice mail or facsimile messages through the telephone interface device 360.

The server system 334 may also include a plurality of individual workstations 361 and 362 (WS) interconnected to the intranetwork 356, some of which can include peripheral devices, such as a printer 364. The workstations 361 and 362 are for use by the data management and programming staff, office staff, and other consultants and authorized personnel.

The database 335 consists of a high-capacity storage medium configured to store individual gasket data files and related installation information. Preferably, the database 335 is configured as a set of high-speed, high capacity hard drives, such as organized into a Redundant Array of Inexpensive Disks (RAID) volume. However, any form of volatile storage, non-volatile storage, removable storage, fixed storage, random access storage, sequential access storage, permanent storage, erasable storage, and the like would be equally suitable.

The individual servers and workstations of the remote center are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 16:
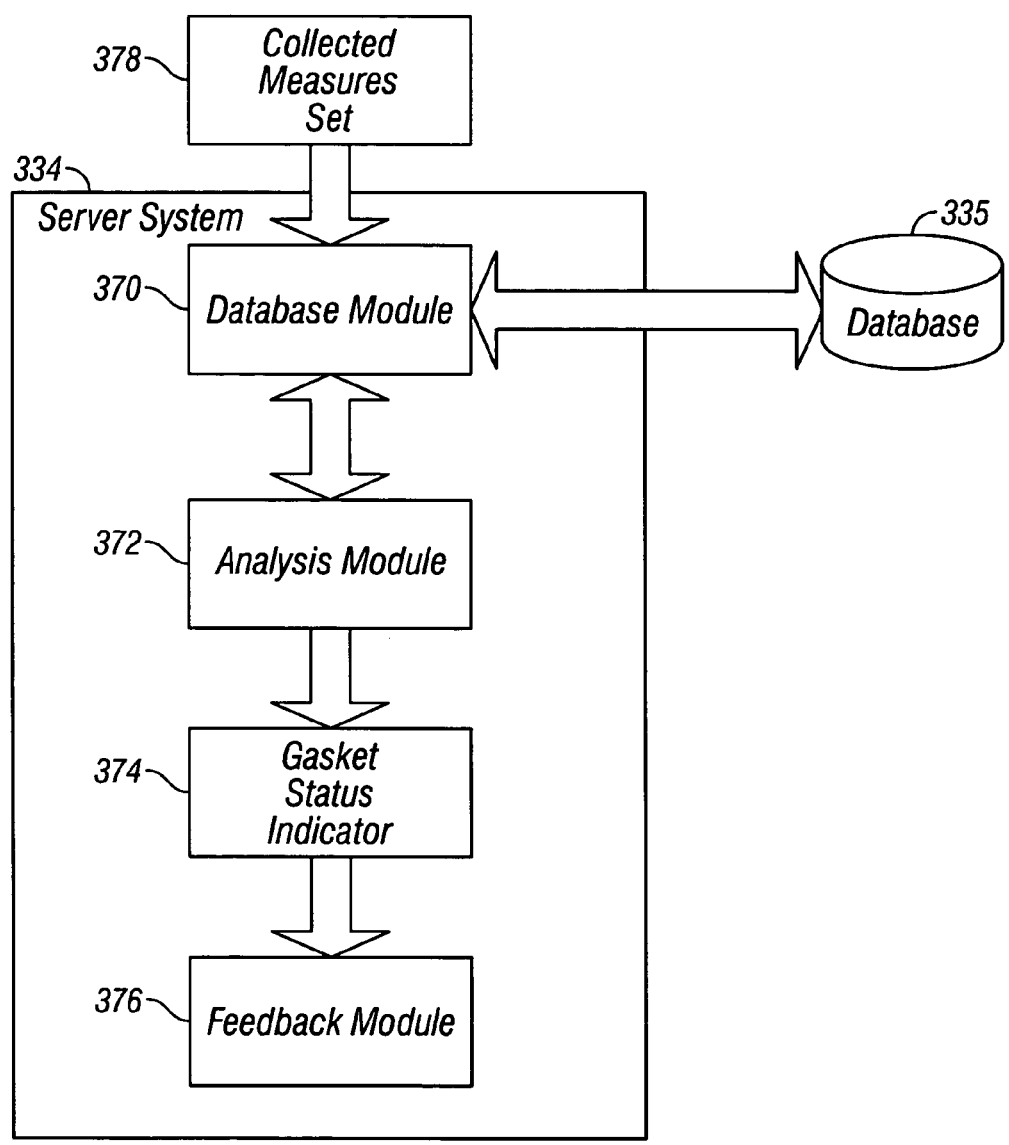
FIG. 16 illustrates the organization of the server system of the remote data center.

FIG. 16 is a block diagram showing the software modules of the server system 334 of the system of FIG. 14. Each module is a computer program written as source code in a conventional programming language, such as the C or Java programming languages, and is presented for execution by the CPU as object or byte code, as is known in the arts. The various implementations of the source code and object and byte codes can be held on a computer-readable storage medium or embodied on a transmission medium in a carrier wave. There are four basic software modules, which functionally define the primary operations performed by the server system 334: database module 370, analysis module 372, gasket status indicator 374, and feedback module 376. In the described embodiment, these modules are executed in a distributed computing environment, although a single server or a cluster of servers could also perform the functionality of the modules.

For each gasket being installed or monitored, the server system 334 periodically receives a data file comprising a collected measures set 378 which is forwarded to the database module 370 for processing. The database module 370 organizes the individual gasket records stored in the database 335 and provides the facilities for efficiently storing and accessing the collected measures sets 378 and gasket data maintained in those records. Any type of database organization can be utilized, including a flat file system, hierarchical database, relational database, or distributed database. The analysis module 372 analyzes the collected measures sets 378 stored in the gasket data files of database 335. The analysis module 372 makes an automated determination of gasket integrity in the form of a gasket status indicator 374. Collected measures sets 378 are received from the field and maintained by the database module 370 in the database 335. Through the use of this collected information, the analysis module 372 can continuously follow the integrity of a gasket over the course of its maintenance history and can recognize any trends in the collected information that might indicate a defect and warrant replacement. The analysis module 372 compares individual measures obtained from both the database records for the individual gasket and the records for a specific group of gaskets.

The feedback module 376 provides automated feedback to the field concerning an individual gasket based, in part, on the gasket status indicator 374. As described above, the feedback could be by electronic mail or by automated voice mail or facsimile. In the described embodiment, four levels of automated feedback are provided. At a first level, an interpretation of the gasket status indicator 374 is provided. At a second level, a notification of potential defect concern based on the gasket status indicator 374 is provided. This feedback level could also be coupled with human contact by specially trained technicians or engineering personnel. At a third level, the notification of potential defect concern is forwarded to field personnel located in the geographic area of the gasket installation. Finally, at a fourth level, a set of maintenance instructions based on the gasket status indicator 374 could be transmitted directly to the field personnel directing them to modify the gasket installation in some manner.

The functionality of the server system diagrammed in FIG. 13 can be provided in a software program resident on personal computer 82. A database of gasket data files would be stored on the hard disk of the computer or provided on a floppy disk or compact disk. The collected measures set processed from data obtained from the capacitance-measuring instrument would be analyzed by an analysis module to generate a gasket status indicator. Feedback to the field maintenance personnel would be provided by a feedback module. The collected measures set could also be telemetered to the remote data center for archiving.

With the gasket arrangements described herein, tolerances in materials and measurement circuitry can result in errors in some cases. For instance, over a wide temperature range some slight change of dielectric constant can occur in most materials. Additionally, some initial variations in dielectric thickness can result from adhesive thickness in manufacturing the layers that make up the sensor. In electrical circuitry, stray capacitance in measurement leads and semiconductor junction capacitance can lead to changes in value. Particularly with a digitized data collection mechanism, these errors can be partially canceled out through a calibration measurement that can be applied to each measurement made. Over time and environmental conditions, however, such initial calibration can become less accurate as values of junction capacitance vary and materials properties change slightly.

Providing a reference sensor having the same variations as the capacitive compression load sensor affords a normalizing correction for the sensor reading. One correction technique would be to divide each sensor measurement by the value of the reference sensor measurement. In such a manner, a 10% variation in the capacitive compression load sensor output caused by the aforementioned variables would-result in an attendant 10% variation in the reference sensor output. The corresponding variations result in cancellation of the error. The reference sensor is positioned outside the gasket compression area. Consequently, the reference sensor output would not change its value as the gasket is compressed. In the case of a raised face flange gasket, for instance, the reference sensor would be in the same plane as the capacitive compression load sensors, but located at a circumference placing it beyond the raised flange area. Prior to applying compression to the gasket, the measured values of capacitance of the reference sensor and the compression load sensors would be approximately equivalent to their relative plate areas. As compression of the gasket occurs, the compression load sensors increase in capacitance due to the decrease in spacing distance, d, in the capacitance formula. The reference sensor value remains unchanged except for any change in material or circuit characteristics, and subsequently cancel out the error produced in the compression load sensor output produced by changes in the material and circuit characteristics.

Figure 17:
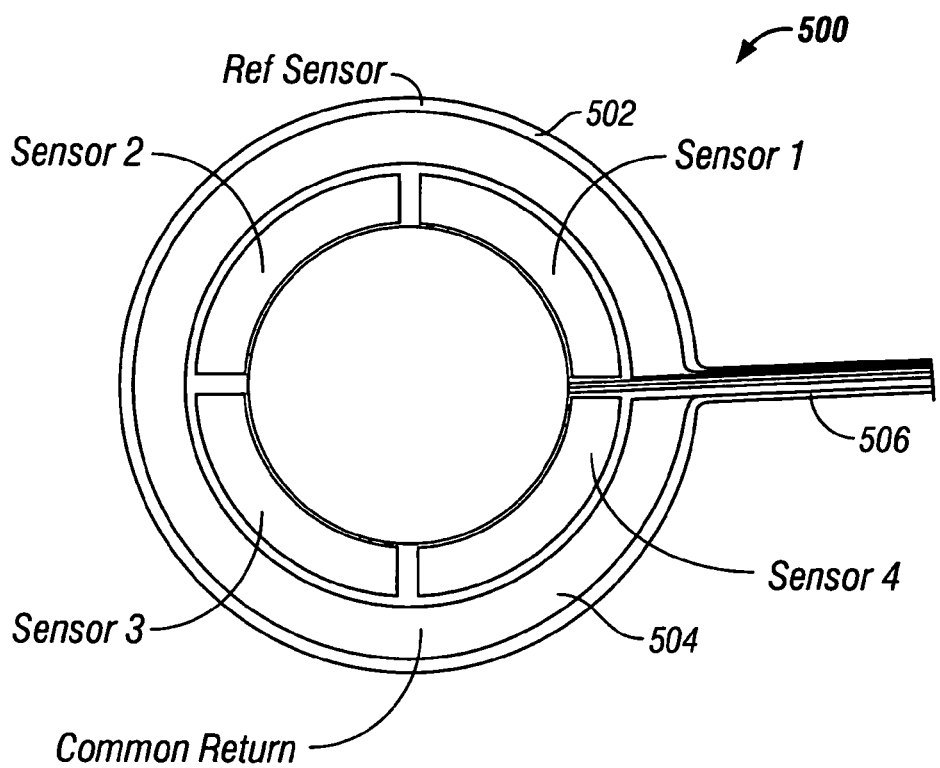
FIG. 17 illustrates a gasket having four compression load sensor areas and a reference sensor area.

FIG. 17 shows a gasket 500 having four compression load sensor areas identified as Sensor 1, Sensor 2, Sensor 3 and Sensor 4. Each of these sensor areas comprises a capacitor plate in accordance with the previously described compression load sensor structures described herein. Extending round the periphery of gasket 500 is a reference sensor area 502 that comprises a capacitor plate. Between the Sensor areas and the reference sensor area is a common return area 504. The Sensors 1–4 areas are positioned within the area circumscribed by the periphery of the flange. The common area can be placed within, outside or a combination of inside/outside the raised flange area. The reference sensor area is outside the flange area. Each of the Sensor 1–4 areas has a conductor extending to tab connector 506. The common return area provides a second connection conductor for all the Sensor 1–4 areas.

Figure 18:
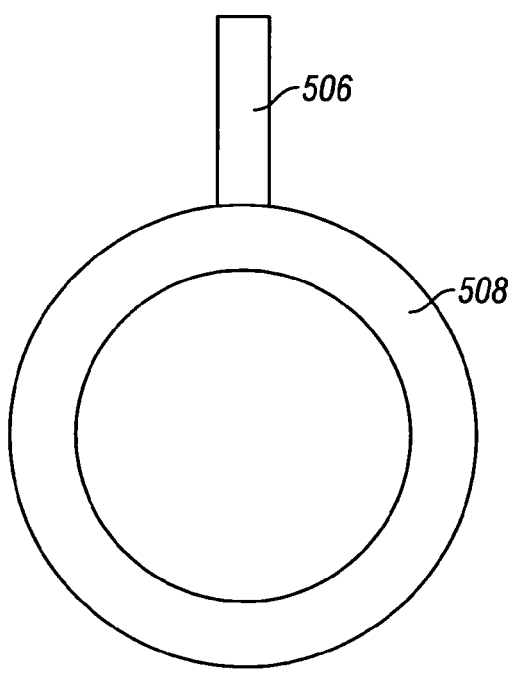
FIG. 18 illustrates a large metallized ring provided as a second capacitor plate for the sensors of FIG. 17.

FIG. 18 shows a large metallized ring 508 provided as a second capacitor plate. The ring 508 is configured to be in registration with the gasket 500. Disposed between the ring 508 and the Sensor 1–4 areas, the common return 504, and the reference sensor area 502 of gasket 500 is a dielectric layer (not shown). Thus, a capacitor is formed between each of the Sensor 1–4 areas and the metallized ring 508. Another capacitor is formed between the reference sensor area and the metallized ring 508. A further capacitor is formed between the common return area and the metallized ring 508. The arrangement results in a capacitance C1 for each of the Sensor 1–4 areas in series with a capacitance C2 for the common return area. The capacitance C2 is not significant in the measurement of the capacitance C1 because the equivalent capacitance for two series connected capacitors is $1/C_T = 1/C1 + 1/C2$. If one capacitance is much larger than the other, the value of $C_T$ is the other, smaller capacitance value.

Figure 19:
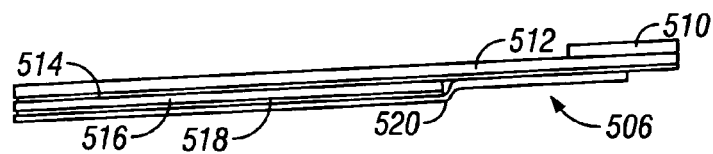
FIG. 19 further illustrates the gasket of FIG. 17 and its construction in a side view showing the various layers.

FIG. 19 further illustrates the gasket 500 construction in a side view showing the various layers. Tab connector 506 is on the right side. A stiffening member 510 is provided for rigidity. An insulator layer 512 (e.g., 0.002" polyamide or polyester) extends across the gasket. A metallized layer 514 includes the Sensor 1–4 areas, the common return area and the reference sensor area. The insulator layer carries the metallized areas and holds them in position. A dielectric layer 516 (e.g., 0.004" Teflon®) is disposed between the metallized layer 514 and a metallized layer 518 that forms the ring 508. A protective insulating layer 520 is placed adjacent the layer 518.

Figure 21:
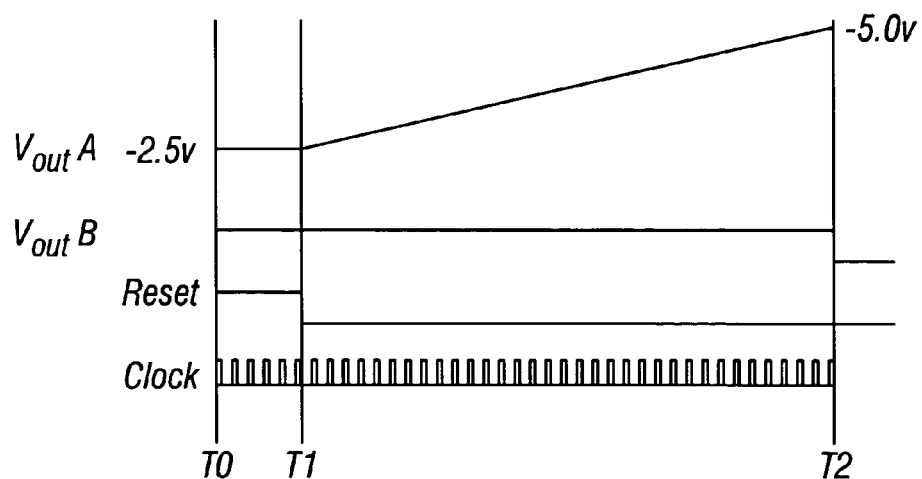
FIG. 21 illustrates a timing diagram explaining the operation of the circuitry of FIG. 20.
Figure 20:
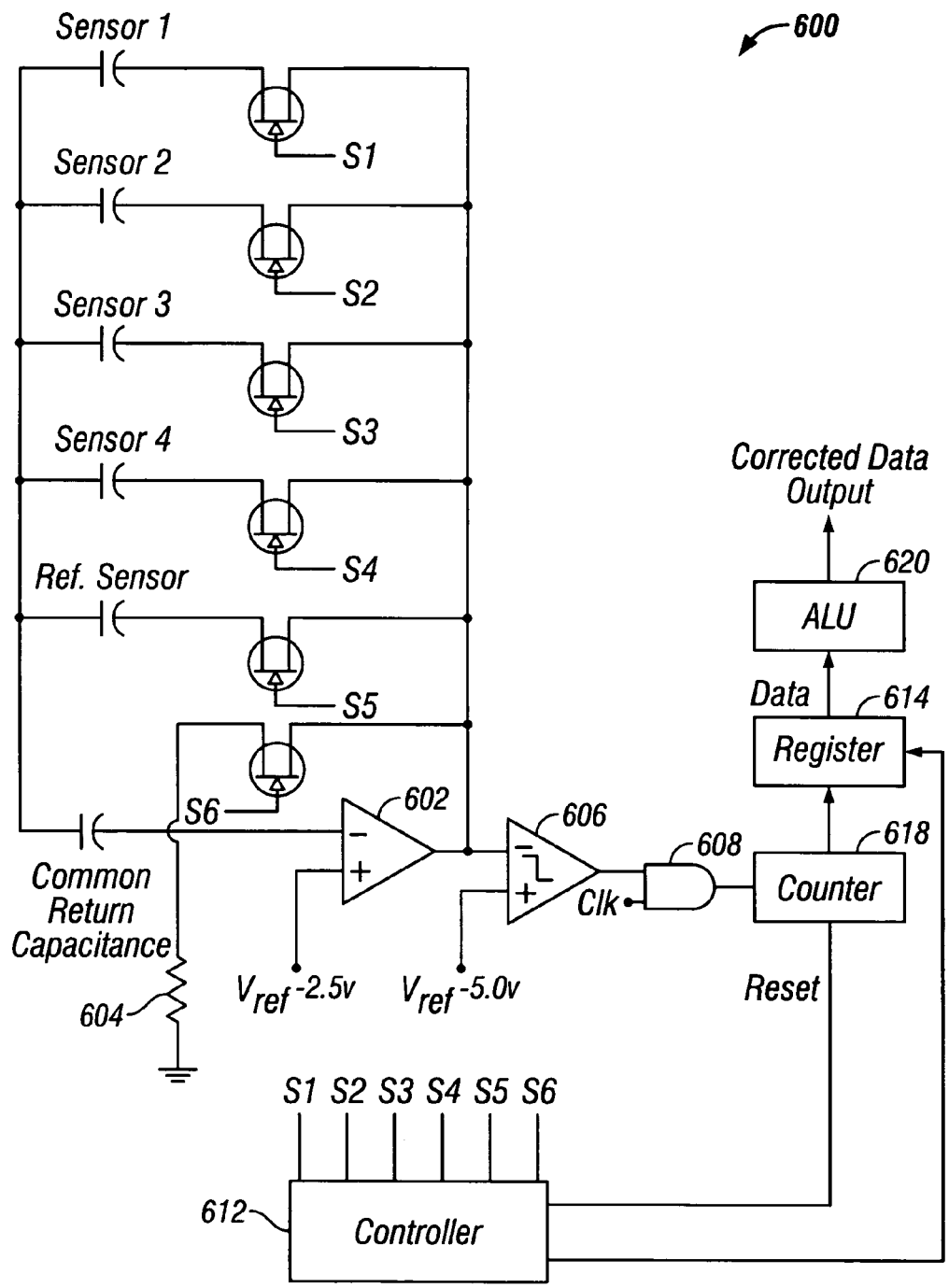
FIG. 20 illustrates a capacitance-measuring instrument for use with the gasket of FIG. 17 and including circuitry for correcting errors in the capacitive gasket compression sensor data.

FIG. 20 illustrates a capacitance measuring circuit for an arrangement of four capacitive sensor and a reference sensor such as shown in FIGS. 19–21. Circuit 600 is shown connected to four capacitors identified as Sensors 1–4 and to a capacitor identified as a Reference Sensor. Also shown is the series connected capacitance provided by the Common Return. Each of the Sensors 1–4 and the Reference Sensor is connected in the feedback loop of an operational amplifier 602. Each of the Sensors 1–4 and the Reference Sensor is connected in series with an FET switch identified, respectively, as S 1–5. Another FET switch S 6 is also connected in the feedback loop of operational amplifier 602. A resistor 604 is connected to the negative input of operational amplifier 602. The positive input of operational amplifier 602 is connected to a voltage reference source $V_{Ref}=2.5$ v. Resistor 604 provides a constant current input to operational amplifier 602 according to $I=V_{Ref}/R$. The output of operational amplifier 602 is applied to the negative input of threshold detector 606, which has its positive input connected to another reference voltage $V_{Ref}=5.0$ v. The output of the threshold detector 606 is provided as a gating input to And gate 608 to control the passing of clock pulses to counter 610. Controller 612 provides control inputs for the switches S 1–6 and a reset control to the counter. Also, Controller 612 provides a control input to register 614 having the capacitance measurement data at its outputs. The Data available from register 614 is made available for display driver (not shown) or to data processing facility such as personal computer 82 shown in FIG. 11.

Operation of circuit 600 is illustrated by the timing diagram of FIG. 21. Switch S6 is closed prior to measurement. A measurement begins at T1 when S6 opens and one of the switches S 1–5 is closed. The operational amplifier 602 acts as an integrator to provide an integral of its input at the output Volt A. Thus, the voltage at the output of operational amplifier 602 ramps toward an upper voltage limit in response to the constant current input. When Volt A reaches the voltage threshold of detector 606, the output Volt B has a transition from a high voltage to a low voltage. The voltage output levels correspond to logic levels used in digital circuits. During the time of the measurement, a clock is running to provide clock pulses to counter 618. However, when the detector 606 goes to a low logic level at T2, And gate 608 no longer gates clock pulses through to the counter. The amount of time that it takes for Volt A to reach the detection threshold of operational amplifier 606 is a function of the capacitance value of the Sensor being measured. Consequently, the number of clocks counted and the count value in the counter is a function of the capacitance of the Sensor being measured. The count value data is transferred to register 614 to be read as the capacitance measurement Data. The register may be configured to store measurement from all Sensors or only a single Sensor. The Data is provided to a circuit 620 such as an arithmetic logic unit (ALU) to perform mathematical operations such as dividing each measured Sensor 1–4 value by the value of the Reference Sensor. The value then becomes one that is free of errors from such sources as operational amplifier leakage current and parasitic capacitance. The ALU produces corrected capacitive gasket compression sensor output data.

As used herein, the term "mating flange faces" is used in its broadest sense to include the flanges at the ends of two tubular members as shown in the drawing figures. However, the term "mating flange faces" is also being used to describe other structures. For example, a vehicle wheel lug nut and the area around a wheel lug opening which form a mating engagement constitute "mating flange faces" within the meaning as used herein. Further, a propeller shaft nut and the hub area around the bore opening of a propeller which form mating engagement constitute "mating flange faces" within the meaning as used herein. Further, the term "gasket" is used in its broadest sense to include structures including "washers" and the like.

Although specific embodiments of the invention have been set forth herein in some detail, it is to be understood that this has been done for the purposes of illustration only and is not to be taken as a limitation on the scope of the invention as defined in the appended claims and the breadth of the disclosure. It is to be understood that various alterations, substitutions, and modifications may be made to the embodiment described herein without departing from the spirit and scope of the invention as set forth in the appended claims.

What is claimed is:

1. A system for determining the integrity of a sealed connection of mating flange faces, comprising:
   a gasket for disposition between the mating flanges, said gasket carrying a capacitor plate;
   a capacitance measuring instrument connectable to the capacitor plate and at least one of the flanges, said capacitance measuring instrument producing a signal indicative of the measured capacitance between the capacitor plate and the flange as a function of gasket compression; and
   a display coupled to the capacitance-measuring instrument to receive the measured capacitance signal and provide a readout of gasket compression.

2. The system of claim 1 wherein the capacitor plate is embedded in the gasket.

3. The system of claim 1 wherein the gasket carries an array of capacitor plates, the plates being disposed at spaced-apart locations.

4. The system of claim 1 wherein the gasket further includes a connector comprising a tab at a peripheral edge of the gasket and a conductor extending from the capacitor plate to the tab.

5. The system of claim 3 wherein the gasket further includes a connector comprising a tab at a peripheral edge of the gasket and a conductor from each element of the array of capacitor plates.

6. The system of claim 1 wherein the gasket comprises a pair of laminated layers and the capacitor plate is sandwiched between the laminated layers.

7. The system of claim 1 wherein the gasket has a slit made in the outer periphery of the gasket forming a pocket and the capacitor plate is disposed within the pocket.

8. The system of claim 1 wherein the display comprises a personal computer coupled to the capacitance-measuring instrument using a universal serial bus interface.

9. The system of claim 8 wherein the personal computer is connectable to a data communication link.

10. The system of claim 1 wherein the display comprises a personal computer connectable to a data communications link for the transmission of gasket integrity data.

11. The system of claim 10 further comprising a remote data center coupled to the data communications link for receiving data from the personal computer.

12. The system of claim 11 wherein the remote data center comprises:
   a network server interfaced to the communications link to receive a set of collected measures from the personal computer, the collected measures set comprising individual measures related to a particular gasket and recorded by the personal computer;
   a database server coupled to the network server and storing the collected measures set into a gasket integrity record for an individual gasket;
   an application server coupled to the database server and analyzing the collected measures sets in the gasket integrity record for the individual gasket relative to one or more other collected measures sets stored in the database server for the individual gasket to determine a gasket status indicator.

13. The system of claim 12 wherein the application server includes a feedback module providing tiered feedback over a feedback communications link to field maintenance personnel concerning individual gasket integrity comprising:
   at a first level of feedback, communicating an interpretation of the gasket status indicator;
   at a second level of feedback, communicating a notification of a potential gasket defect concern based on the gasket status indicator to on-site field maintenance personnel;
   at a third level of feedback, communicating a notification of a potential gasket defect concern based on the gasket status indicator to maintenance personnel in local proximity to the individual gasket; and
   at a fourth level of feedback, communicating a set of gasket installation modification instructions based on the gasket status indicator.

14. The system of claim 1 wherein the display comprises a personal computer that processes the measured capacitance signal to provide gasket compression information.

15. The system of claim 14 wherein the personal computer includes software comprising:
   a software module providing a set of collected measures comprising individual measures related to a particular gasket and recorded by the personal computer;
   a database storing the collected measures set into a gasket integrity record for an individual gasket;
   a software module analyzing the collected measures sets in the gasket integrity record for the individual gasket relative to one or more other collected measures sets stored in the database for the individual gasket to determine a gasket status indicator; and
   a feedback module providing feedback to field maintenance personnel concerning individual gasket integrity, said feedback including communicating an interpretation of the gasket status indicator, communicating a notification of a potential gasket defect concern based on the gasket status indicator; and communicating gasket installation modification instructions based on the gasket status indicator.

16. A method of determining the integrity of a sealed connection between mating flange faces, comprising the steps of:
   disposing a gasket carrying a capacitor plate between mating flange faces;
   measuring the capacitance between the gasket capacitor plate and at least one of the mating flange faces;
   computing the spacing between the gasket capacitor plate and at least one of the mating flange faces; and
   displaying a measure of gasket compression determined as a function of the spacing between the gasket capacitor plate and at least one of the mating flange faces.

17. A system for determining the compression imposed by mating flange faces on a gasket disposed between the flange faces, comprising:
   a capacitor plate carried by the gasket;
   a capacitance measuring instrument connectable to the capacitor plate and at least one of the flanges, said capacitance measuring instrument producing a signal indicative of the measured capacitance between the capacitor plate and the flange as a function of gasket compression; and
   a signal-processing instrument coupled to the capacitance-measuring instrument to receive the measured capacitance signal and compute a measure of gasket compression for display.

18. A system for determining the integrity of a sealed connection of mating flange faces, comprising:
   a gasket for disposition between the mating flange faces, said gasket carrying first and second spaced-apart parallel capacitor plates;

a capacitance measuring instrument connectable to the capacitor plates, said capacitance measuring instrument producing a signal indicative of the measured capacitance between the capacitor plates as a function of spacing between the plates; and a display coupled to the capacitance-measuring instrument to receive the measured capacitance signal and provide a readout of gasket compression.

19. The system of claim 18 wherein the gasket comprises first, second and third gasket layers and wherein the first capacitor plate is sandwiched between the first and second gasket layers and the second capacitor is sandwiched between the second and third gasket layers.

20. The system of claim 18 wherein the gasket comprises first, second and third gasket layers and wherein the first capacitor plate is embedded into the first gasket layer and wherein the second capacitor plate is embedded into the third gasket layer.

21. The system of claim 18 wherein the gasket comprises first, second and third gasket layers and wherein the second gasket layer is disposed between the capacitor plates and comprises a dielectric material.

22. The system of claim 18 wherein the gasket further includes a connector comprising a tab at a peripheral edge of the gasket and a conductor extending from each of the capacitor plates to the tab.

23. The system of claim 18 wherein each of the capacitor plates comprises an array of capacitor plate elements.

24. The system of claim 23 wherein the gasket further includes a connector comprising a tab at a peripheral edge of the gasket and a conductor extending from each of the capacitor plate elements.

25. A system for determining the integrity of a sealed connection of mating flange faces, comprising:

a gasket having a spiral wound component and a guide ring;

a capacitor plate including a metallization layer carried on a surface of the guide ring;

a dielectric layer extending over a surface of the metallization layer;

a conductor coupled to the metallization layer of the capacitor plate;

a capacitance measuring instrument connectable to the conductor and at least one of the flanges, said capacitance measuring instrument producing a signal indicative of the measured capacitance between the metallization layer of the capacitor plate and the flange as a function of dielectric layer compression; and a display coupled to the capacitance-measuring instrument to receive the measured capacitance signal and provide a readout indicative of the compression loading on the spiral wound component.

26. The system of claim 25 wherein the guide ring is metal and a second dielectric layer extends across the opposite side surface of the metallization layer.

27. The system of claim 25 wherein the guide ring is an insulating material.

28. The system of claim 25 wherein the guide ring carries a second metallization layer on the opposite side surface and a dielectric layer extends across the surface of the second metallization layer.

29. A system for determining the integrity of a sealed connection of mating flange faces, comprising:

a gasket for disposition between the mating flanges, said gasket carrying a capacitor plate and a common electrode to be electrically coupled to one of the mating flange faces;

a tab connector portion positioned at a location along a peripheral edge of the gasket and having electrical connector terminations coupled to the capacitor plate and the common electrode carried by the gasket;

a capacitance measuring instrument connectable to the capacitor plate and the common electrode by connection to the electrical connector terminations on the tab connector portion, said capacitance measuring instrument producing a signal indicative of the measured capacitance between the capacitor plate and the flange as a function of gasket compression; and a display coupled to the capacitance-measuring instrument to receive the measured capacitance signal and provide a readout of gasket compression.

30. A system for determining the integrity of a sealed connection of mating flange faces, comprising:

a gasket for disposition between the mating flanges, said gasket having a sealing area, an outer guide ring, and a capacitor plate carried in an area between the sealing area and the outer ring;

a capacitance measuring instrument connectable to the capacitor plate and at least one of the flanges, said capacitance measuring instrument producing a signal indicative of the measured capacitance between the capacitor plate and the flange as a function of gasket compression; and a display coupled to the capacitance-measuring instrument to receive the measured capacitance signal and provide a readout of gasket compression.

31. A system for determining the integrity of a sealed connection of mating flange faces, comprising:

a gasket for disposition between the mating flanges, said gasket carrying a gasket compression sensor comprising a capacitor plate and varying in capacitance as a function of gasket compression;

a capacitance measuring instrument connectable to the gasket compression sensor, said capacitance measuring instrument producing a signal indicative of measured capacitance of the gasket compression sensor; and a display coupled to the capacitance-measuring instrument to receive the measured capacitance signal and provide a readout of gasket compression.

32. The system of claim 31 wherein the display comprises a personal computer coupled to the capacitance-measuring instrument using a universal serial bus interface.

33. The system of claim 32 wherein the personal computer is connectable to a data communication link.

34. The system of claim 33 further comprising a remote data center coupled to the data communications link for receiving data from the personal computer.

35. The system of claim 31 wherein the display comprises a personal computer connectable to a data communications link for the transmission of gasket integrity data.

36. A system for determining the integrity of a sealed connection of mating flange faces, comprising:

a gasket for disposition between the mating flanges, said gasket carrying a gasket compression capacitance sensor comprising a capacitor plate and varying in capacitance as a function of gasket compression;

a capacitance measuring instrument connectable to the gasket compression sensor, said capacitance measuring instrument producing a signal indicative of measured capacitance of the gasket compression capacitance sensor; and a signal processing instrument coupled to the capacitance measuring instrument to receive the measured capacitance signal, said signal processing instrument producing gasket integrity data based on the measured capacitance signal and having a data communication link interface for transmission of the gasket integrity data over a data communication link.

37. The system of claim 36 further comprising a remote data center coupled to the data communications link for receiving data from the signal-processing instrument.

38. The system of claim 37 wherein the remote data center comprises:
   a network server interfaced to the communications link to receive a set of collected measures from the personal computer, the collected measures set comprising individual measures related to a particular gasket and recorded by the personal computer;
   a database server coupled to the network server and storing the collected measures set into a gasket integrity record for an individual gasket;
   an application server coupled to the database server and analyzing the collected measures sets in the gasket integrity record for the individual gasket relative to one or more other collected measures sets stored in the database server for the individual gasket to determine a gasket status indicator.

39. The system of claim 38 wherein the application server includes a feedback module providing tiered feedback over a feedback communications link to field maintenance personnel concerning individual gasket integrity comprising:
   at a first level of feedback, communicating an interpretation of the gasket status indicator;
   at a second level of feedback, communicating a notification of a potential gasket defect concern based on the gasket status indicator to on-site field maintenance personnel;
   at a third level of feedback, communicating a notification of a potential gasket defect concern based on the gasket status indicator to maintenance personnel in local proximity to the individual gasket; and
   at a fourth level of feedback, communicating a set of gasket installation modification instructions based on the gasket status indicator.

40. A gasket for disposition between mating raised face flanges, comprising:
   a gasket body of a flat, circular configuration and having opposite surfaces, said gasket carrying a capacitor plate; and
   a pair of protuberances on one of the surfaces and radially located thereon so as to be positioned for abutting an outer edge of a raised face portion of a flange upon installation, said protuberances being spaced apart less than 180° along the circumference of the gasket body and providing for alignment of the gasket body relative to the mating flange faces upon installation.

41. A system for determining the integrity of a sealed connection of mating flange faces, comprising:
   a gasket for disposition between the mating flanges, said gasket carrying an array of gasket compression capacitance sensors and a reference capacitance sensor;
   a capacitance measuring instrument individually connectable to the array of gasket compression capacitance sensors and to the reference capacitance sensor, said capacitance measuring instrument producing an output indicative of the measured capacitance of each gasket compression capacitance sensor and of the measured capacitance of the reference capacitance sensor; and
   a circuit coupled to the capacitance measuring instrument to receive the measurement output for each gasket compression capacitance sensor and the measurement output for the reference capacitance sensor, the circuit combining the measurement outputs of each gasket compression capacitance sensor and the reference capacitance sensor to produce corrected gasket compression capacitance sensor outputs.

* * * * *